Patented Sept. 14, 1926.

1,599,444

UNITED STATES PATENT OFFICE.

ANDRÉ WAHL, OF ENGHIEN, AND ROBERT LANTZ, OF PARIS, FRANCE, ASSIGNORS TO SOCIETE ANONYME DES MATIERES COLORANTES ET PRODUITS CHIMIQUES DE SAINT-DENIS, OF PARIS, FRANCE.

PROCESS FOR THE PREPARATION OF NEW DERIVATIVES OF NAPHTHOQUINONE.

No Drawing. Application filed December 21, 1922, Serial No. 608,334, and in Germany December 28, 1921.

In their U. S. Patent, No. 1,460,774, applicants have described a new class of naphthalene derivatives, the 1-arylamino-2-hydroxy naphthalenes. On further study of these compounds we have found that they can be transformed into new products which can be used for the synthetic production of dyestuffs.

Thus, for example, 1-arylamino-2-hydroxy naphthalenes become easily oxidized on submitting their alkaline solution to the action of an oxidizing agent such as, for example, the hypochlorites, the peroxides, iodine, atmospheric air, etc. With these reacting bodies, and when operating under suitable conditions, there can be removed 2 atoms of hydrogen and the still unknown 1-arylimino-2-naphthoquinones can be obtained. The reaction can be expressed as follows, R designating the radical aryl:

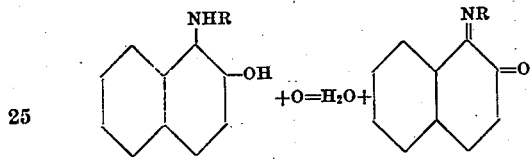

The compounds which are obtained in this way, are generally in the form of dark green crystals, insoluble in water, soluble in organic solvents such as ether, acetone, the acetone giving a beautiful colour between blue and blue-green. These 1-arylimino-2-naphthoquinones are but little stable, their solutions alter with time, slowly in the cold and rapidly in the hot; the crystals themselves become altered in the dark.

The 1-arylimino-2-naphthoquinones have a great power of reaction which is common to quinonic molecules. Thus, for instance, they have the power to fix the alkaline sulphites and bisulphites in order to give sulphonated compounds which form themselves apparently according to the following reaction:

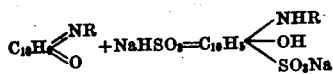

These new sulphonic acids form crystals which are slightly coloured gray, little soluble in water, soluble in the alkaline bodies with which they form salts.

The following examples will serve to show these different transformations, but it is obvious that the conditions under which they can take place can be largely modified.

*Example 1.—Preparation of 1-arylimino-2-naphthoquinone.*

106 grs. (2/5 mol) of 1-(orthomethoxy) phenylamino-2-hydroxy-naphthalene resulting from the reaction of ortho-anisidine upon the 1-chloro or 1-bromo-2-hydroxy-naphthalene are dissolved in 80 cubic centimeters of soda of 40° Bé. and 800 cubic centimeters of alcohol. This solution is diluted with 14 to 15 liters of ice water and into this solution, filtered if necessary and strongly stirred, is introduced a thin stream of a solution of sodium hypochlorite containing the theoretical proportion of chlorine in from 8 to 10 liters of water. The temperature is maintained at about 5° C. and the reaction is followed with iodine-starch paper. The crystalline green precipitate which is formed is dried, pressed and can be purified by crystallization in diluted acetone or in a mixture of ether and petroleum ether. Green crystals are then formed which are soluble in neutral organic solvents like acetone, ether, and giving a beautiful blue color. These solutions are unstable even when cold and alter very quickly when hot; the crystals themselves alter even when they are kept away from the light.

The analysis as well as the properties of this substance correspond to those of a 1-(orthomethoxy) phenylimino-2-naphthoquinone formed according to the following formula:—

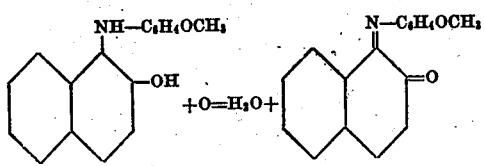

The percentages of C, of H and of N, in the composition are as follows:

|   | Found | Calculated for $C_{17}H_{13}O_2N$ |
|---|---|---|
| C % | 77.96 | 77.56 |
| H % | 5.32 | 4.94 |
| N % | 5.38 | 5.32 |

If, for instance, in the preceding example, the ortho-methoxyphenylamino hydroxy naphthalene is replaced by equimolecular quantities of 1-phenylamino-hydroxynaphthalene or of 1-tolylamino-hydroxynaphthalene or of naphthylamino-hydroxynaphthalene, etc., the corresponding 1-arylimino-2-naphthoquinone will be obtained.

*Example 2.—Sulphonic acid of an hydroxy-arylamino-naphthalene.*

A mixture of 40 grs. of 1-phenylimino-2-naphthoquinone, freshly prepared and pressed, and 55 c. c. of a solution of bisulphite of sodium of 36° Bé. are triturated in a mortar, at the ordinary temperature. The green coloration of the phenylimino-naphthoquinone disappears by and by and there is formed a gray crystalline precipitate. When the reaction is complete, the operation is repeated with a concentrated solution of carbonate of sodium, filtered and acidified by a mineral acid. The product of the reaction is precipitated in the form of small gray crystals which can be recrystallized in dilute alcohol containing hydrochloric acid. The reaction is as follows:

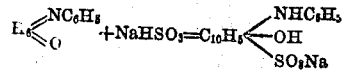

For the free acid, the analysis gives in fact the following figures:

|  | Found | Calculated for $C_{16}H_{13}O_4NS$ |
|---|---|---|
| N % | 4.2 | 4.4 |
| S % | 10.37 | 10.1 |

The free acid forms colourless crystals, little soluble in water; its sodium salt is very soluble and its solutions have a very great green flourescence.

By substituting for the 1-phenylimino-2-naphthoquinone, its homologous or its direct derivatives, a similar reaction can be obtained.

What we claim is:

1. A process of preparing 1-arylimino-2-naphthoquinones which consists in treating the 1-arylamino-2-hydroxy naphthalene with oxidizing agents in an alkaline medium.

2. As new products, the 1-arylimino-2-naphthoquinones.

In testimony whereof we have signed this specification.

ANDRÉ WAHL.
ROBERT LANTZ.